United States Patent
Eriksson et al.

(10) Patent No.: US 6,321,682 B1
(45) Date of Patent: Nov. 27, 2001

(54) COMBINED CLEANING AND PRE-MILKING DEVICE

(75) Inventors: Jan Eriksson, Uttran; Ole Lind, Tumba, both of (SE)

(73) Assignee: DeLaval Holding AB, Tumba (SE)

(*) Notice: Subject to any disclaimer, the term of this patent is extended or adjusted under 35 U.S.C. 154(b) by 0 days.

(21) Appl. No.: 09/555,783
(22) PCT Filed: Dec. 4, 1998
(86) PCT No.: PCT/SE98/02224
§ 371 Date: Jun. 5, 2000
§ 102(e) Date: Jun. 5, 2000
(87) PCT Pub. No.: WO99/27775
PCT Pub. Date: Jun. 10, 1999

(30) Foreign Application Priority Data
Dec. 4, 1997 (SE) ................................... 9704515

(51) Int. Cl.[7] ................. A01J 5/04; A01J 3/00; A01K 29/00
(52) U.S. Cl. .................. 119/14.44; 119/14.08; 119/612; 119/670
(58) Field of Search ............. 119/14.02, 14.08, 119/14.09, 14.18, 14.44, 14.47, 604, 652, 670, 612

(56) References Cited

U.S. PATENT DOCUMENTS

| | | | |
|---|---|---|---|
| 4,305,346 | * 12/1981 | Sparr, Sr. | 119/670 |
| 5,211,961 | 5/1993 | Adkinson | 424/616 |
| 5,383,423 | * 1/1995 | Van der Lely | 119/14.02 |
| 5,673,650 | * 10/1997 | Mottram et al. | 119/670 |
| 6,098,570 | * 8/2000 | Aurik et al. | 119/604 |
| 6,155,204 | * 12/2000 | Ven der Lely et al. | 119/14.08 |

FOREIGN PATENT DOCUMENTS

| | | |
|---|---|---|
| 0 347 004 | 12/1989 | (EP) . |
| 0 527 509 | 2/1993 | (EP) . |
| 0 630 558 | 12/1994 | (EP) . |
| 0 728 412 | 8/1996 | (EP) . |
| 0 801 893 | 10/1997 | (EP) . |
| 2 272 626 | 5/1994 | (GB) . |
| 1349735 | 11/1987 | (SU) . |

* cited by examiner

Primary Examiner—Charles T. Jordan
Assistant Examiner—Elizabeth Shaw
(74) Attorney, Agent, or Firm—Young & Thompson

(57) ABSTRACT

The present invention relates to a device and method for cleaning and pre-milking teats. The device comprises a teat receiving means (3, 53) having a teat receiving opening (5, 55) and cleaning means (9, 59), and it further comprises vacuum-supplying means (19, 69) and teat receiving opening sealing means (6, 56). Means (14, 16, 18, 20, 22) for sterilising teats may also be provided.

14 Claims, 4 Drawing Sheets

COMBINED CLEANING AND PRE-MILKING DEVICE

TECHNICAL FIELD OF THE INVENTION

The present invention relates to teat cleaning devices of the type according to the preamble of claim 1 for cleaning and pre-milking the teats of animals. The present invention also relates to a method according to the preamble of claim 6 for cleaning and pre-milking the teats of animals.

DESCRIPTION OF RELATED ART

When dairy animals are to be milked it is necessary to first clean the teats of the animal to avoid dirt present on the teats contaminating the collected milk. It is also desirable (and even a legal requirement in some countries) to pre-milk the teats. By pre-milking is meant the first phases of milking in which:

the teat is stimulated in order to stimulate the milk ejection reflex and induce milk letdown; and, the milking is started and the first drops of milk are collected separately for inspection and/or discarded in order to prevent contaminants, on or inside the teat from being transported into the rest of the milking machinery. During pre-milking it is desirable that the whole of the milk contained in the teat is extracted. This milk can then be inspected for signs of disease or contamination.

It is known from EP-A-0 527 509 to use a teat-cup containing water to clean the teat and then to use the same teat cup for milking. This requires extremely thorough, time-consuming cleaning of the teatcup between the cleaning phase and the milking phase.

Another device shown in DE 127 384 permits cleaning of the teats by vertical rotating brushes but this device is unable to premilk the teats.

SUMMARY

An object of the present invention is to provide a device and a method for cleaning and pre-milking which overcomes the problems associated with previous devices for cleaning and pre-milking.

The objects art achieved according to the present invention by means of a device and a method having the features mentioned in the characterising parts of the independent claims. Further developments and improvements of the present invention are mentioned in the dependent claims.

BRIEF DESCRIPTION OF THE DRAWINGS

The invention will described more closely with the help of examples of embodiments and the appended figures in which.

DETAILED DESCRIPTION OF THE EMBODIMENTS

Figure 1:
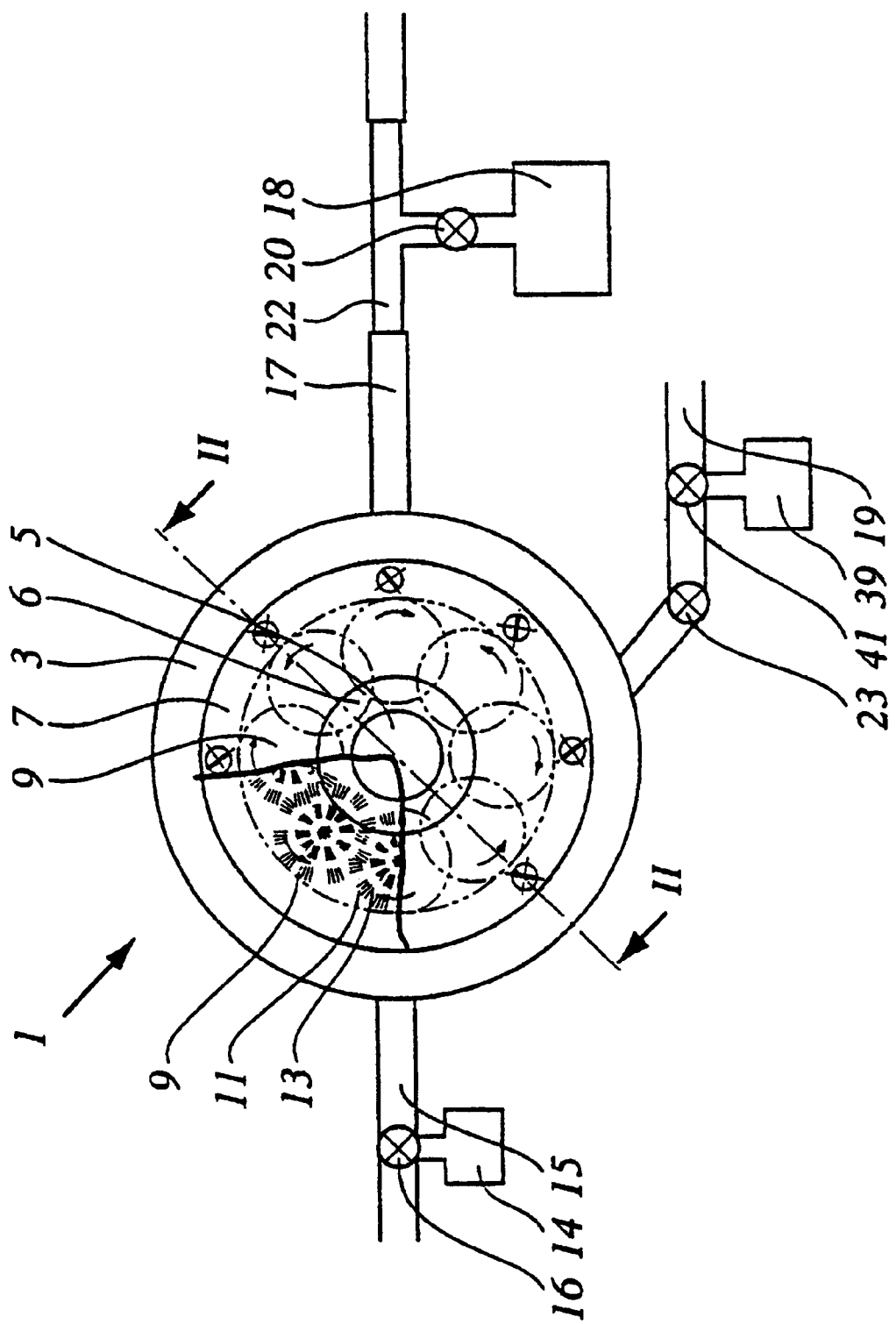
FIG. 1 is a schematic view from above partly in section, of one embodiment of a cleaning and pre-milking device according to the invention.
Figure 2:
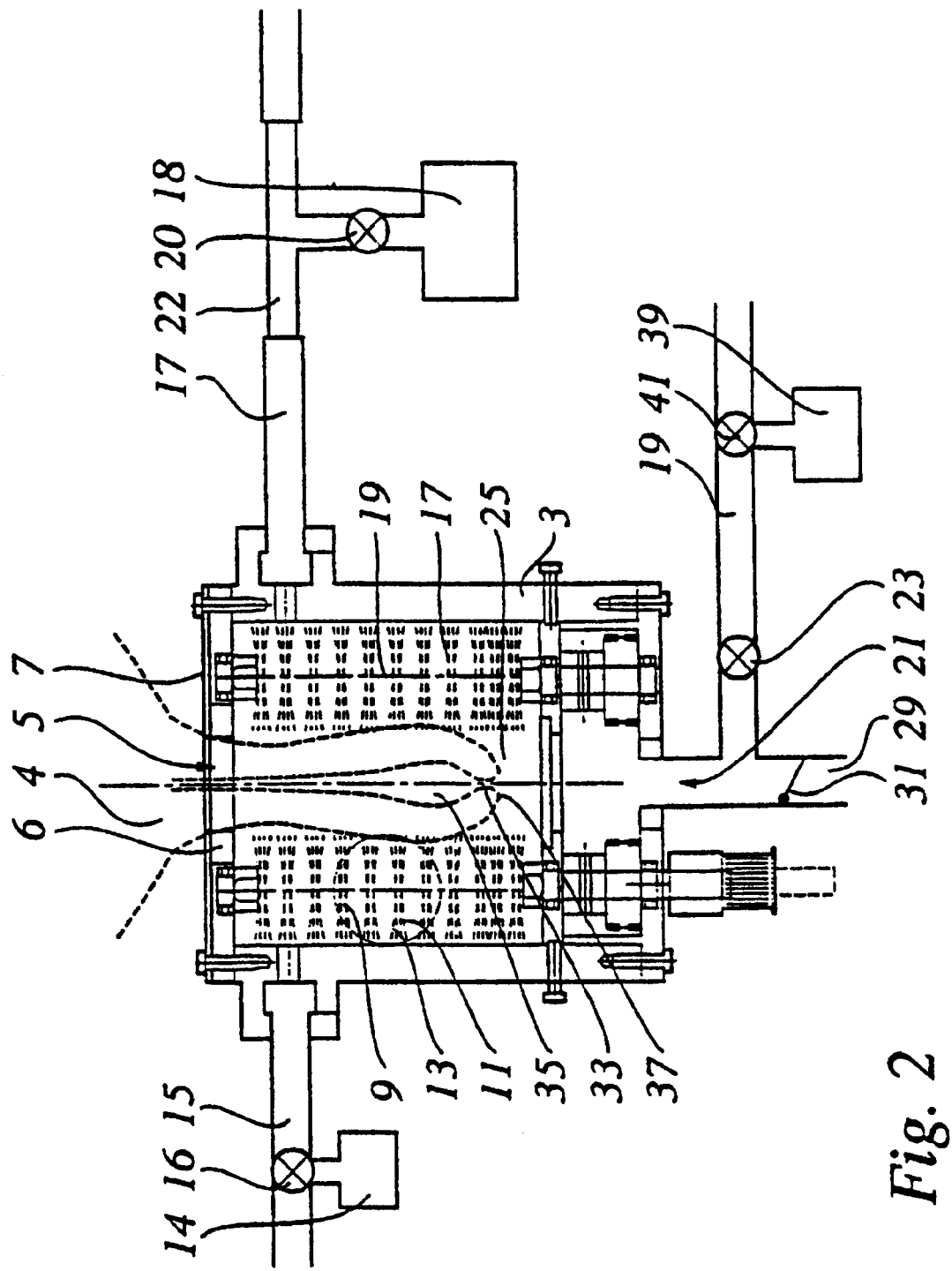
FIG. 2 is a cross-sectional view along line II—II of FIG. 1.

FIGS. 1 and 2 show a first example of an embodiment of the present inventions in which parts which are well-known to the skilled person but which are non-essential for the understanding of the invention have been omitted for the sake of clarity.

The teat cleaning device 1 shown in FIGS. 1 and 2 comprises a teat receiving means in the shape of a box-like holder 3 with a teat receiving opening 5 in its upper surface 7. Holder 3 is intended to be placed under the udder of an animal to be milked with opening 5 below a teat 4 which is to be cleaned. Holder 3 is then raised so that teat 4 enters the holder through opening 5. Opening 5 has seating means 6 in the shape of a resilient sealing rubber or plastic collar 6 which is in contact with the udder when teat 4 is fully inserted into holder 3. Holder 3 contains a plurality of cleaning means 9 shown here as elongated cylindrical brushes 11 with bristles 13. Holder 3 also contains cleaning fluid supplying means 15 in be form of a hose 15 connected to a cleaning fluid supply (not shown), drying air supplying means 17 in the form of a tube 17 connected to an air supply (not shown), and vacuum supplying means 19 in the form of non-collapsible pipe 19 connected to a vacuum supply (not shown). Vacuum supplying pipe 19 is connected to an outlet opening 21 in the base of holder 3 via a valve means 23.

Brushes 11 are each orientated with their longitudinal ads substantially perpendicular to the plane of upper surface 7 and are arranged in a circle with a central space 25 able to receive a teat. Brushes 11 are rotatably mounted an holder 3 and can be rotated by driving means 27. There are preferably an even number of brushes 11 and preferably each brush 11 rotates in the opposite direction to its neighbouring brushes 11, as is shown by the arrows, in order to prevent twisting of the teat 4. To prevent an exceptionally narrow teat being drawn into the space between two brushes 11 and possibly damaged by squeezing barrier means 12 can be provided between the brushes 11. In this embodiment the barrier means 12 consist of vertically projecting rods 12 which are fixed to the holder 3 in the areas between the brushes 11. These rods preferably extend a distance equal to the distance between the base of holder 3 to its top and are substantially parallel to the axes of the brushes. Preferably, as shown here, these rods 12 are positioned at a distance from the centre of holder 3 which is less than the diameter of the circle which the axis of the brushes 11 are arranged in, and these rods 12 are arranged approximately midway between their neighbouring brushes 11. A teat 4 is cleaned by first being fully inserted into holder 3 and then by being brushed by rotating brushes 11 preferably while cleaning fluid is supplied through cleaning fluid supplying means 15. Cleaning fluid can be supplied as a pulsating stream to improve the cleaning effect. The cleaning fluid leaves the holder via outlet opening 21 which has an outlet 29 with a non-return valve 31 which permits the cleaning water to drain away either to a sewage system or to a storage system for possible examination and recycling. Preferably the draining of the cleaning fluid from the holder is assisted by a vacuum (not shown) applied to the outlet 29. The cleaning fluid is preferably passed through a liquid separating means which separates the cleaning fluid from the under-pressure air in order to prevent the fluid being drawn into the vacuum supply and to enable the fluid to be analysed.

After cleaning teat 4 is dried by air blown into the holder 3 from the drying air supplying means 17. After passing teal 4 the air can leave the holder 3 through outlet 21. During drying the brushes 11 can continue to rotate in order to dry them.

Preferably after being dried teat 4 can be pre-milked. This is achieved by producing an under-pressure in holder 3 by opening vacuum supply valve 23. This under-pressure is chosen to be sufficient to overcome the muscle pressure holding closed the milk canal 33 which leads from the teat milk cavity 35 from the tip 37 of the teat. This causes the milk canal 33 to open and the premilk contained in the milk cavity 35 to flow to the tip 37. The milk is sucked though opening 21 and into the vacuum supply pipe 19. This supply pipe leads to a collector vessel 39 which collects the premilk which can then be examined for contaminants and infections. The vacuum is applied for a period of time sufficiently long to ensure that the teat is completely emptied of premilk The vacuum can varying in strength to give a pulsating effect which can better stimulate the animal to release milk. The time can be determined for example by experiment or by using fluid sensing means which detect the presence or absence of milk in the vacuum pipe. During premilking the brushes 11 are preferably stationary to prevent any possible remaining contaminants being dislodged.

After the premilk has been collected the holder can be removed from the teat. Collector vessel 39 can have an its valve 41 which can be used to close the inlet to the vessel 39 after the premilk has team collected. This permits the vacuum supply pipe 19 to be cleaned by supplying cleaning fluid to the holder 3 at the same time as a vacuum is applied.

While this example has been illustrated using cylindrical brushes with bristles any suitable, cleaning surface such as foamed plastic, rubber rollers etc. may be used. Additionally the brushes can be assembled of columns of disks of brushing material wherein disks of varying diameter cart be positioned alternatingly to form a brush with a crenelated or notched profile. Adjacent brushes can have complementary profiles and can be positioned so that the disks are interwoven in order to provide the best cleaning effect.

Furthermore other embodiments of barrier means are also conceivable. For example, a barrier means could consist of a vertically standing tube arranged substantially concentric with the centre axis of be holder 3. The tube, which could be cylindrical or have a multi-sided cross-section, would have an outside diameter or maximum width which is less than the diameter of the circle which the axis of the brushes 11 are arranged in to avoid interfering with the shafts of the brushes, and an inside minimum diameter or width which is greater than the maximum possible teat size which it is envisaged to be able to clean. The tube would be provided with openings in its wall wherein the opening would be arranged to allow the brush bristles to pass though them and come into contact with the teat. These openings could be horizontal slits arranged at the level of the bunches of bristles or the widest disks projecting from the brushes. Alternatively vertical slots which are sufficiently wide for the bristles to penetrate as far as possible towards the centre of the casing could be used. In the latter case the tube could resemble a number of vertical rods arranged in a circle and joined at the top and/or bottom by an annulus.

Figure 3:
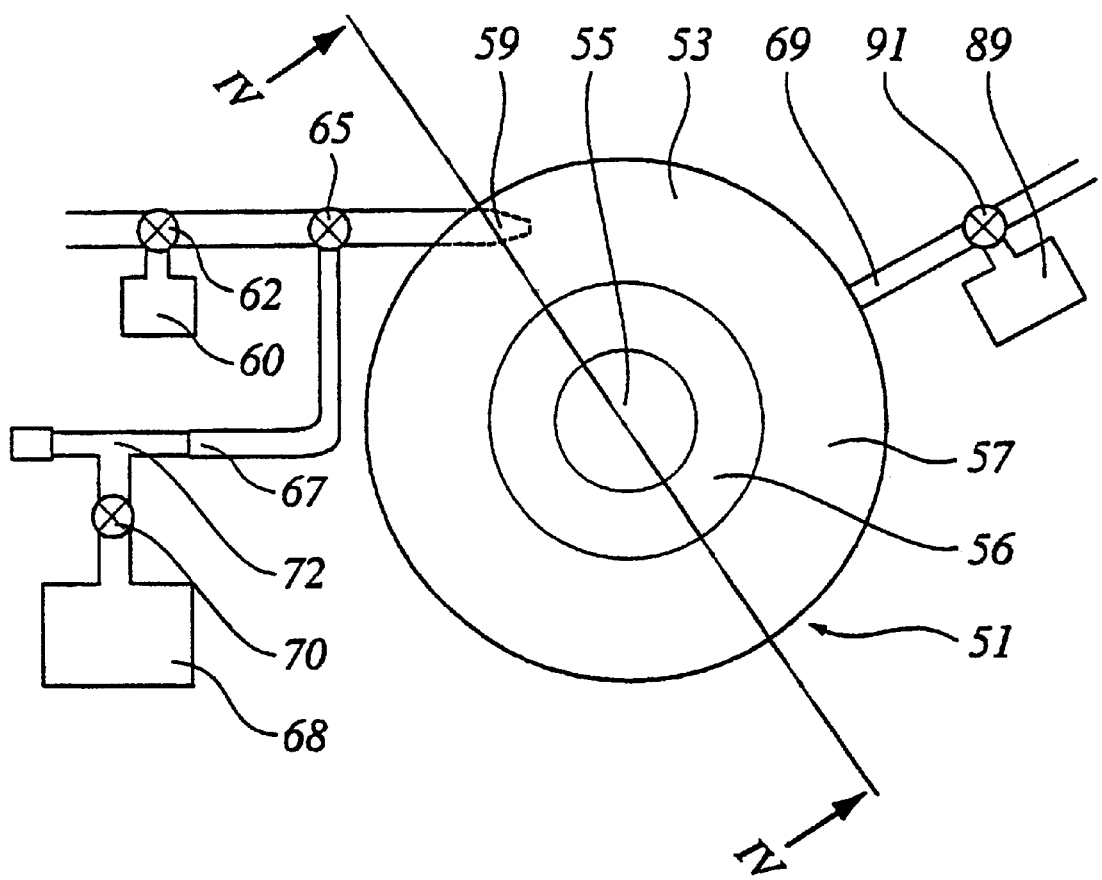
FIG. 3 is a schematic view from above, partly in section, of a second embodiment of a cleaning and pre-milking device according to the invention.
Figure 4:
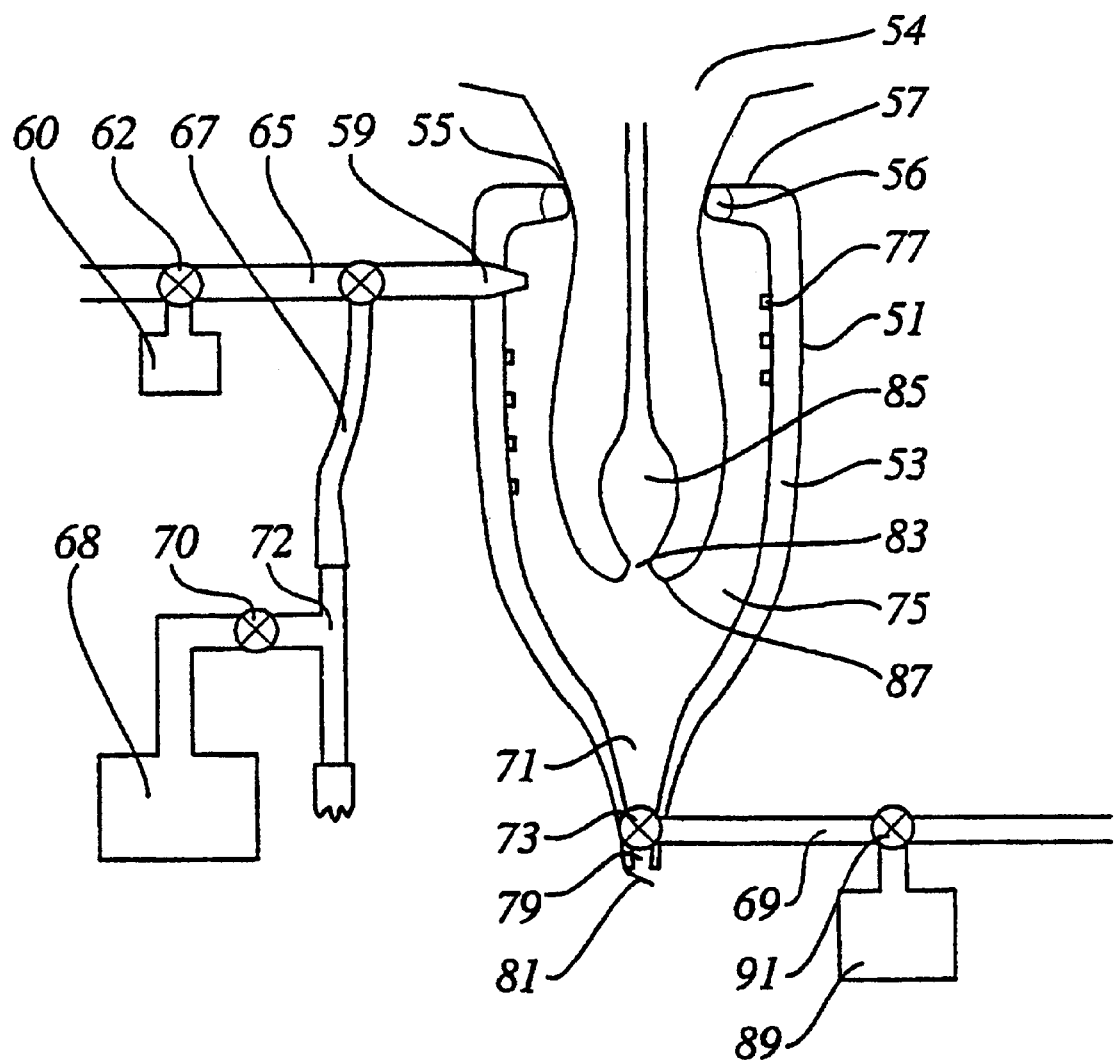
FIG. 4 is a cross-sectional view along line IV—IV of FIG. 3.

FIGS. 3 and 4 show a second embodiment of a device in accordance With the present invention in which parts non-essential for the understanding of the invention have been omitted for the sake of clarity.

The teat cleaning device 51 shown in FIGS. 3 and 4 comprises a teat receiving means in the shape of an approximately cylindrical teatcup 53 with a teat receiving opening 55 in its upper surface 57. Teatcup 53 is intended to be placed under the udder of an animal to be milked with opening 55 below a teat 54 which is to be cleaned. Teatcup 53 is then raised so that teat 54 enters the holder through opening 55. Opening 55 has sealing means 56 in the shape of a resilient sealing collar 56 which is in substantially air-tight sealing contact with the udder when teat 54 is fully inserted into teatcup 53. Teatcup 53 has cleaning means 59 in the form of at least one approximately tangential inlet nozzle 59 near to the upper surface 57. A cleaning fluid supplying means 65 in the form of a hose 65 connected to a cleaning fluid supply (not shown) and drying air supplying means 67 in the form of a the 67 connected to an air supply (not shown) can be selectively connected to nozzle 59. A vacuum supplying means 69 in the form of a non-collapsible pipe 69 connected to a vacuum supply (not shown) is connected to an outlet opening 71 in the base of teatcup 53 via a valve means 73.

A teat is cleaned by being inserted into teatcup 53 and sprayed by high speed cleaning fluid ejected from nozzle 59. The impact of the fluid on the circular inner wall 75 of the teatcup 53 produces vortices which clean the teat due to their turbulent motion. This turbulent motion, and consequential cleaning effect can be increased and adjusted, for example, by pulsating the fluid flow, injecting air into the fluid flow, applying a vacuum to the teatcup, and/or disturbing the flow by means of protuberances 77 on the inner wall 75. In alternative embodiment the flow could be disturbed by jets of air introduced by air inlets (not shown) positioned for this purpose on the wall. Furthermore it is possible for some or all of the cleaning fluid to be directed to impact tangentially on the teat. Combinations of the above-mentioned turbulence inducing means are naturally also conceivable.

In a manner similar to that described above the cleaning fluid leaves the teatcup 53 via outlet opening 71 which has an outlet 79 with a non-return valve 81 which permits the cleaning water to drain away either to a sewage system or to a storage system for possible examination and recycling. Preferably the draining of the cleaning fluid from the teat cup 53 is assisted by a vacuum (not shown) applied to the outlet 79. Using a vacuum causes the teat to expand which cracks and loosens any dried-on matter on the teat. This makes it easier to remove the dried-on matter during the cleaning process.

After cleaning teat 54 is dried by air blown into the teatcup 53 from the drying air supplying means 67. After passing teat 54 the air can leave the teatcup 53 through outlet 71.

Preferably after drying teat 54 can be pre-milked. This is achieved by producing an under-pressure in teatcup 53 by opening vacuum supply valve 73. This under-pressure is chosen to be sufficient to overcome the muscle pressure holding closed the milk canal 83 which leads from to teat milk cavity 85 from the tip 97 of teat 54. This causes the milk canal 83 the open and the premilk contained in the milk cavity 85 to flow to the tip 87. The milk is sucked though opening 71 and into the vacuum supply pipe 69. This supply pipe 69 leads to a collector vessel 89 which collects the premilk which can then be examined for the presence of contaminants, such as dirt faeces, blood, etc. and signs of infection, e.g. pus, blood, bacteria, antibodies, etc. The vacuum is applied for a time sufficiently long to ensure that the teat is completely emptied of premilk. The time can be determined for example by experiment or by using fluid sensing means which detect the presence or absence of milk in the vacuum pipe.

After the premilk has beam collected The teatcup 53 can be removed from the teat. Collector vessel 89 can have an inlet valve 91 which can be used to close the inlet to the vessel 89 after the premilk has been collected. This permits the vacuum supply pipe 69 to be cleaned by, for example, supplying cleaning fluid to the teatcup 53 at the same time as a vacuum is applied.

While the above embodiment has been illustrated with only one tangential inlet nozzle it is of course possible to provide other nozzle orientations in order to ensure adequate cleaning. The cleaning effect can also be enhanced by providing the teatcup with internal flexible bristles which can be made to brush the teat under the influence of the fluid flowing in the teatcup.

It is conceivable that the teat receiving opening sealing means of the present invention could be an inflatable collar or a series of collars or any other suitable sealing means.

The device of the present invention can naturally be fitted with safety devices such as safety valves which prevent the under-pressure dropping below a predetermined value.

It is conceivable to provide a teat cleaning means in accordance with the invention with teat sterilising means which can ensure that the teats are free of living bacteria before be premilking or milking commences. The sterilisation can be performed by adding a sterilising median such as a sterilising or anti-bacteriological liquid to the cleaning fluid used to clean the teats or by using a sterilising fluid to sterilise the teats before or after the cleaning operation. The sterilising fluid can, for example, be contained in a vessel 14, 60 connected by a valve 16, 62 to the cleaning fluid supply line 15, 65. Alternatively, or—as shown in figures—additionally the sterilising can be performed by using a sterilising gas, for example ozone. The sterilising gas may be used ether on is own or it may be mixed into the drying air supplied by the drying air supplying means 17, 67. The sterilising gas can, for example, be contained in, or produced in, a vessel 18, 68 and connected by a preferably computer-controlled valve 20, 70 to a T-piece 22, 72 on the drying air supplying means 17, 67. It is naturally conceivable that the sterilising liquid or gas can be supplied by separate supply lines, especially if it has a deleterious effect on the material normally used to make cleaning fluid and air lines.

In order to achieve the best results it is preferable that the sterilising operation is performed after the cleaning operation such that substantially all of the surface of the teat is free from dirt or other contaminants so that the sterilising liquid or gas can come into contact with substantially the whole of the surface of the teat and surrounding udder.

We do embodiments of the invention have been described for use for both cleaning and premilking it is conceivable that they could be used for just cleaning or just premilking. Furthermore they could be adapted by combination with teat stimulating milking equipment and milk collection means to perform milking. The invention can be adapted to be controlled and maneuvered manually by providing manually operated valves and controls and it is also possible to adapt it for use, with milking robots in a robot milking system by providing note-controlled valves and controls and a controlling means such as a computer.

What is claimed is:

1. Teat cleaning and pre-milking device comprising a teat receiving means (3) having a teat receiving opening (5), sealing means (6) for sealing said opening (5) against an udder, cleaning means (9) for cleaning a teat inserted into said teat receiving means (3), and means for extracting pre-milk from the teat, characterised in that said teat cleaning means (9) comprises
   cylindrical rotatable brushes (11) arranged in a circle and forming a central space able to accommodate a teat where longitudinal axes of said brushes (11) are substantially parallel to a longitudinal axis of said teat receiving means (3), and that said means for extracting pre-milk comprises
   vacuum-supplying means (19) for providing said teat receiving means with an under-pressure.

2. Teat cleaning and pre-milking device according to claim 1, characterised in that it comprises barrier means in the form of elongated rods (12) located between the brushes (11) for preventing the teat to be drawn into the space between two brushes (11).

3. Teat cleaning and pre-milking device according to claim 1, characterised in that it comprises barrier means in the form of a tube substantially concentrically arranged with a longitudinal axis of the teat receiving means (3), wherein said tube is provided with openings in its walls for the brushes to come in contact with the teat.

4. Teat cleaning and pre-milking device according to claim 1, characterised in that it comprises an outlet (21) which can be selectively connected to a pre-milk collector vessel (39).

5. Teat cleaning and pre-milking device according to claim, 1, characterised in that said sealing means (6) comprises a resilient collar.

6. Teat cleaning and pre-milking device according to claim 1, characterised in that said sealing means (6) comprises an inflatable collar.

7. Teat cleaning and pre-milking device according to claim 1, characterised in that it comprises teat sterilising means.

8. The use of the teat cleaning and pre-milking device in accordance with claim 1, in a robot milking system.

9. Teat cleaning and pre-milking device comprising a teat receiving means (53) having a teat receiving opening (55), sealing means (56) for sealing said opening (55) against an udder, cleaning means (59) for cleaning a teat inserted into said teat receiving means (53) and means for extracting pre-milk from the teat, characterised in that said teat cleaning means (59) comprises
   at least one nozzle, (59), which is perpendicular to a longitudinal axis of said teat receiving means (53) and approximately tangentially arranged near an upper surface of said teat receiving means, for injecting fluid therein, and that said means for extracting pre-milk comprises
   vacuum-supplying means (69) for providing said teat receiving means (53) with an under-pressure.

10. Teat cleaning and pre-milking device according to claim 9, characterised in that it comprises protuberances (77) on inner walls of the teat cup (53) for increasing the cleaning action of the injected fluid.

11. Teat cleaning and pre-milking device according to claim 9, characterised in that it comprises an outlet (21) which can be selectively connected to a pre-milk collector vessel (39).

12. Teat cleaning and pre-milking device according to claim 9, characterised in that said sealing means (56) comprises a resilient collar.

13. Teat cleaning and pre-milking device according to claim 9, characterised in that said sealing means (56) comprises an inflatable collar.

14. Teat cleaning and pre-milking device according to claim 9, characterised in that it comprises teat sterilising means.

* * * * *